United States Patent [19]
Wallmeier et al.

[11] Patent Number: 5,278,825
[45] Date of Patent: Jan. 11, 1994

[54] METHOD FOR MONITORING AND SMOOTHING DATA STREAMS THAT ARE TRANSMITTED ASYNCHRONOUSLY

[75] Inventors: Eugen Wallmeier; Thomas Worster, both of Munich, Fed. Rep. of Germany

[73] Assignee: Siemens Aktiengesellschaft, Munich, Fed. Rep. of Germany

[21] Appl. No.: 830,079

[22] Filed: Jan. 31, 1992

[30] Foreign Application Priority Data

Feb. 1, 1991 [EP] European Pat. Off. ........ 91300807.4

[51] Int. Cl.$^5$ .............................................. H04J 3/22
[52] U.S. Cl. ...................... 370/60; 370/61; 370/84; 370/94.1
[58] Field of Search .................... 370/60, 60.1, 61, 79, 370/80, 84, 94.1, 94.2, 108

[56] References Cited

U.S. PATENT DOCUMENTS

| | | | |
|---|---|---|---|
| 5,083,269 | 1/1992 | Syobatake et al. | 370/60 X |
| 5,119,364 | 6/1992 | Thiebaut et al. | 370/94.1 X |
| 5,184,346 | 2/1993 | Kozaki et al. | 370/60 |
| 5,189,672 | 2/1993 | Le Bihan | 370/94.1 |

FOREIGN PATENT DOCUMENTS

WO90/11659 10/1990 PCT Int'l Appl. .

OTHER PUBLICATIONS

*Fast Switching and Fair Control of Congested Flow in Broad-Band Networks*, by Mangolis G. H. Katevenis, IEEE Journal on Selected Areas in Communications SAC-5 (1987) Oct., No. 8, New York, pp. 1315-1326.
*A Congestion Control Frameword for High-Speed Integrated Packetized Transport*, by G. M. Woodruff et al., IEEE Global Telecommunications Conf. & Exhibition, Nov. 28-Dec. 1, 1988, vol. 1, pp. 0203-0207.
*New Directions in Communications (or Which Way to the Information Age?)*, by Jonathan S. Turner, International Zurich Seminar on Digital Communications, May, 1986, pp. A3.1-A3.8.

Primary Examiner—Douglas W. Olms
Assistant Examiner—Melvin Marcelo
Attorney, Agent, or Firm—Hill, Steadman & Simpson

[57] ABSTRACT

A method for a transmission line via which message cells of a plurality of virtual connections having separately defined transmission bit rates asynchronously transmitted, wherein, depending on the transmission bit rate declared for a connection and depending on the chronological spacing of message cells belonging to the same connection that are intended for forwarding, a time slot in which a message cell is to be forwarded is identified for every message cell, whereby a message cell—depending on the length of the time slot calculated for it—either is discarded or is stored for forwarding in the respective, calculated or in a following time slot.

8 Claims, 3 Drawing Sheets

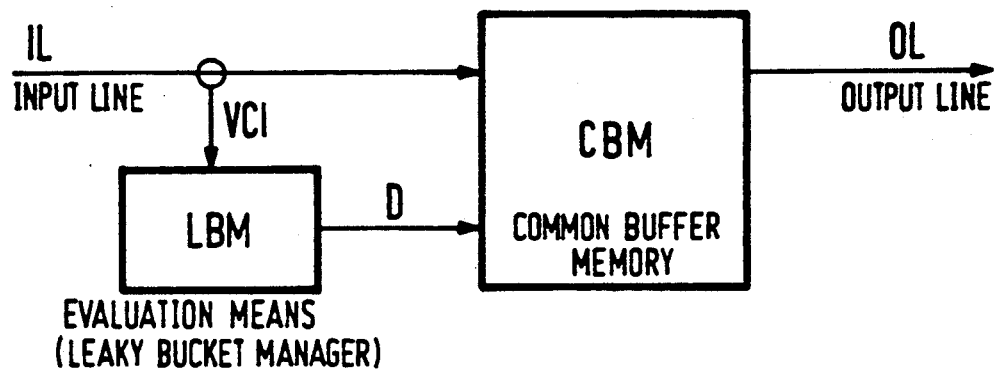
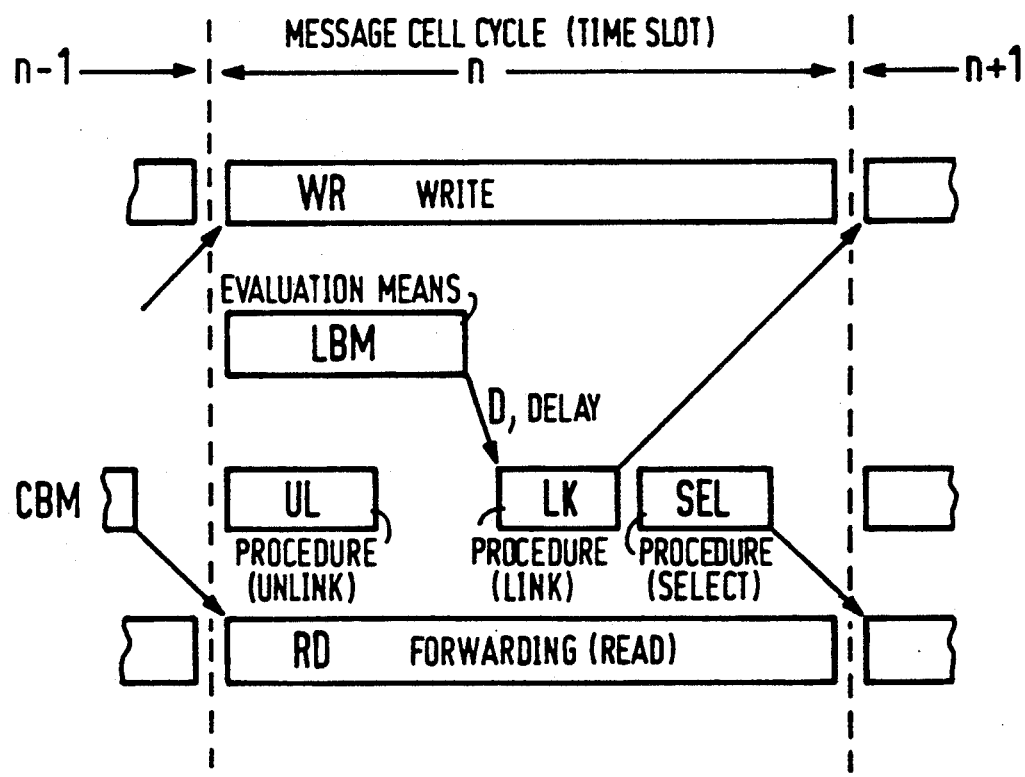

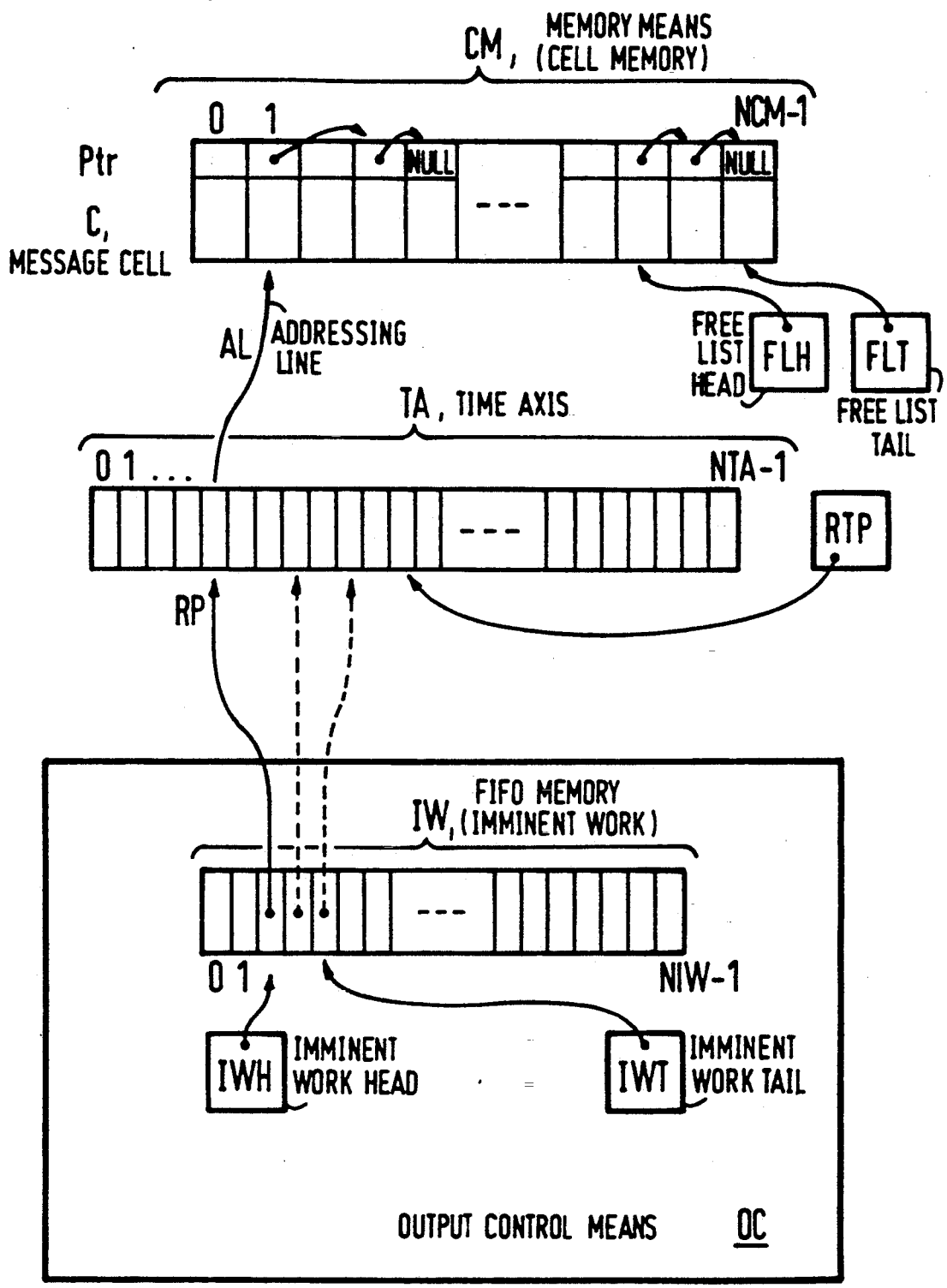

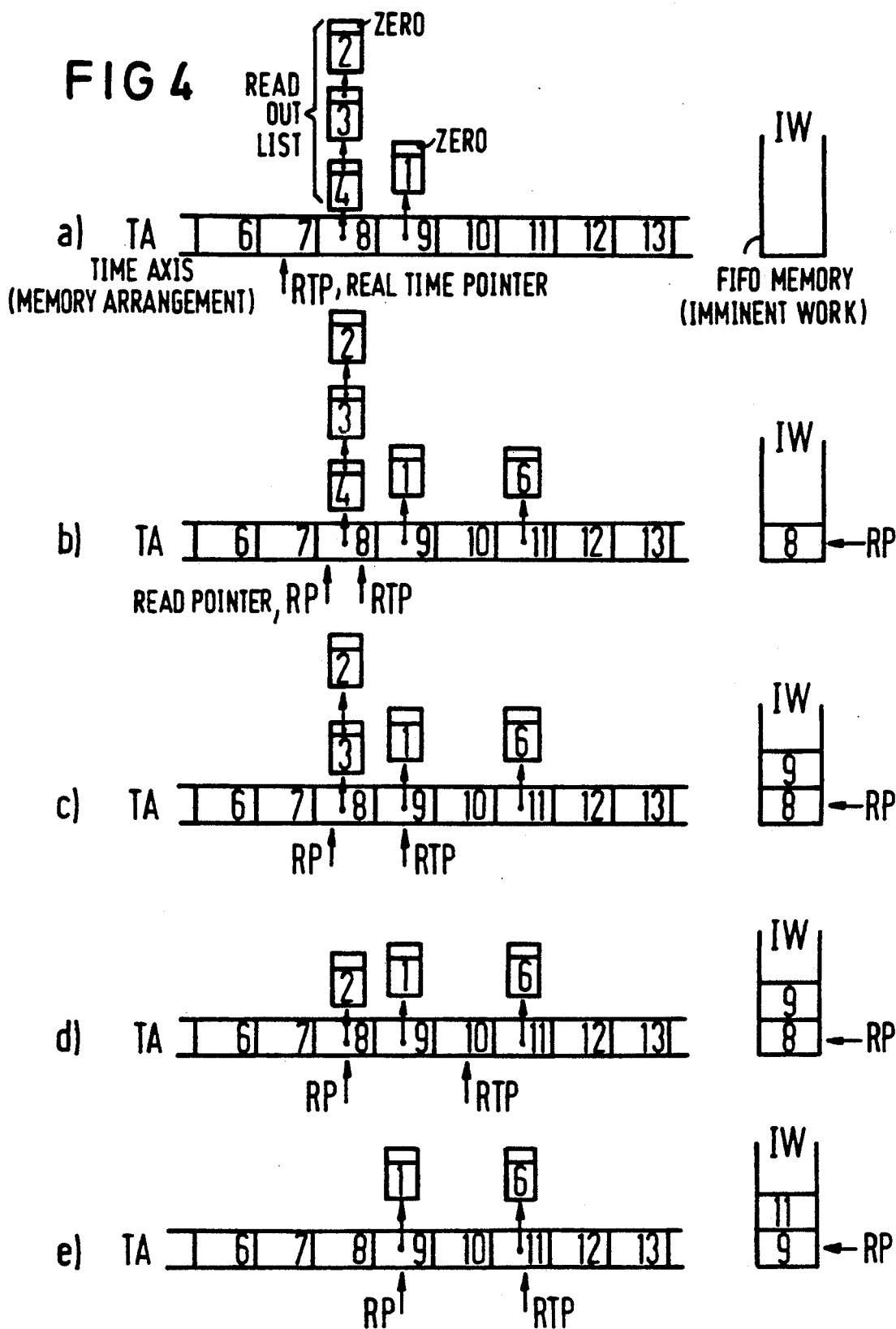

METHOD FOR MONITORING AND SMOOTHING DATA STREAMS THAT ARE TRANSMITTED ASYNCHRONOUSLY

BACKGROUND OF THE INVENTION

The present invention generally is directed to asynchronous data transmission in switching systems. More specifically, the invention is directed to a method for monitoring the transmission bit rate defined for asynchronous transmissions of message cells during the course of the set-up of virtual connections on transmission lines in switching systems, particularly broad band switching systems, wherein message cells whose transmission would exceed the transmission bit rate defined for the relevant connection are discarded.

It is known to define a maximum transmission bit rate in asychronous transmission switching systems during the course of set-up of virtual connections between, among other things, a subscriber station and a broadband switching node. Such a transmission bit rate, for example, can be established by a defined plurality of message cells having constant lengths per unit of time. Monitoring devices, generally referred to as policing equipment, are provided at the access locations of the switching network for monitoring the defined transmission bit rate.

It is known from an article by J. S. Turner, titled "New Directions in Communications" and published in the International Zurich Seminar on Digital Communications, March 1986, at A3.1 through A3.8, to allocate a forward-backward counter in a switching node of a broadband switching system to every subscriber station connected thereto. These forward-backward counters count the message cells transmitted by the respective subscriber stations and decrement a momentary counter reading at defined times in accordance with the transmission bit rate defined by the respective subscriber station. When the momentary counter reading upwardly exceeds a value prescribable by the respective subscriber station, then the switching node recognizes an overload condition. This can be referred to as the "leaky bucket" method.

When accessing an offering trunk shared in common by a plurality of subscriber stations that, for example, connects a private branch exchange (to which the subscriber stations are connected) to the broadband switching system, temporary transgressions of the defined transmission bit rate can occur at the access location of the broadband switching system despite adherence to the defined transmission bit rate by the subscriber station terminal equipment. An increase of the subscriber station associated transmission bit rate at the access location of the broadband switching system can result when two subscriber stations wish to simultaneously access the common offering trunk and thereby cause an access conflict that is resolved by delaying the transmission of individual message cells, so that the message cell following a delayed message cell in a virtual connection thereby affected appears within a shorter time frame than would correspond to the transmission bit rate declared during the call set-up and observed by the pertinent subscriber station terminal equipment.

Connection associated policing equipment arranged at the access location of the broadband switching system that functions according to the traditional leaky bucket method must tolerate temporary, upward transgressions of brief duration of the respectively declared transmission bit rates that can derive from jitter resulting on the offering trunk. Such tolerant behavior by traditional policing equipment vis-a-vis brief duration transgressions of the connection associated declared transmission bit rates, however, could be exploited in such a way that at least a limited number of message cells are transmitted by a subscriber station terminal equipment in a more rapid succession than corresponds to the declared transmission bit rate without the policing equipment at the input of the broadband switching system responding. As a result, the performance capability of a broadband switching system can deteriorate.

SUMMARY OF THE INVENTION

The present invention provides a method that makes it possible for a transmission system to handle a data stream that can comprise message cells from a plurality of actual connections and that can be affected by connection-associated jitter in such a way that connection associate bit rates are strictly limited and any connection associated jitter is compensated.

To these ends, in an embodiment, the invention provides a method wherein, depending on the transmission bit rate declared for a connection and on the chronology of message cells belonging to the connection and queued for forwarding, a time slot is identified for each message cell to be forwarded, whereby: message cells for which time slots are calculated that exceed a prescribed time frame are discarded, every non-discarded message cell is stored in combination with a flag that corresponds to its respective time slot, message cells that are to be forwarded in the same time slot are combined in the form of a read-out list, and then the message cells are forwarded in their flagged time slot or, respectively, the message cells of the read-out list are forwarded in the flagged time slot and a corresponding plurality of time slots following thereafter.

Despite being tolerant vis-a-vis fluctuations in the message cell repetition rate of incoming message cells of a respective virtual connection, the method of the invention, which, moreover, avoids the formation of connection associated wait lists whose time suited read-out would hardly seem implementable anyway given current standard message cell repetition rates, assures that the sequence of outgoing message cells does not exceed the corresponding transmission bit rate declared upon call set-up and, given employment at the access location to a broadband switching system, thus enables a reliable protection against overload of the broadband switching system.

In a particular embodiment of the invention, message cells united in the form of a read-out list are forwarded beginning with the message cell most recently added to the read-out list. This particular embodiment provides the advantage that message cells belonging to a particular virtual connection that arrive in a uniform sequence and message cells that, for example, arrive delayed due to an access conflict and, thus, are accepted into the read-out lists shortly before the beginning of the forwarding of the message cells united into the read-out list, are forwarded with an optimally short delay caused by the forwarding of the message cells of the read-out list.

These and other features of the invention will become clearer below with reference to the following detailed description of the presently preferred embodiments with reference to the accompanying drawings.

BRIEF DESCRIPTION OF THE DRAWINGS

FIG. 1 illustrates a block circuit diagram of a circuit arrangement for implementing the method of the invention.

FIG. 2 illustrates in greater detail the block identified as CBM in FIG. 1.

FIG. 3 illustrates a chronology of typical executions during a message cell cycle in accordance with the method of the invention.

FIG. 4 illustrates events that occur when message cells are forwarded.

DETAILED DESCRIPTION OF THE PRESENTLY PREFERRED EMBODIMENT

In FIG. 1 there is schematically illustrated a circuit arrangement to which message cells are supplied via an input line IL, this input line IL forwarding the message cells onto an output line OL having the same nominal transmission bit rate as that of the input rate IL. The input line IL can be an offering trunk from a private branch exchange having a plurality of subscriber stations to a broadband switching system via which a plurality of virtual connections can be set-up. The output OL can be an access line to a broadband switching system.

In the circuit arrangement of FIG. 1, a copy of a header portion containing the virtual channel number VCI of every message cell incoming on the input line IL, which, as is known, comprises a header portion and an information portion, is supplied to an evaluation means LBM, while the entire message cell is supplied to a reception means (or receiver), not illustrated, by way of a memory CBM. Depending on the transmission bit rate defined for the relevant connection and on the time between message cells belonging to the same connection and already destined for forwarding, evaluation means LBM calculates a time slot in which the relevant message cell is to be forwarded. A time slot can be calculated with the assistance of a special leaky bucket procedure that evaluates current leaky bucket quantities stored for every virtual connection in memory locations associated with the connection.

For each connection, these leaky bucket quantities concern the maximum filling level of the relevant leaky bucket, the current filling level of the leaky bucket, the outflow rate of the leaky bucket, and influx quantity corresponding to the incoming message cell, and the point in time of the arrival of the preceding message cell intended for forwarding and belonging to the virtual connection under consideration. A new filling level (i.e., amount of filling level) of the relevant leaky bucket is calculated for the relevant virtual connection for every message cell incoming on the input line IL such that the most recently calculated filling level is reduced by the quantity that has since flowed out. A measure D (delay) is calculated by dividing the filling level by the relevent outflow rate, that is proportional with the associated transmission bit rate. Thus, D gives a delay measured in a certain number of time slots between the current time slot and the time slot at which the respective message cell ought to be forwarded on the output line. The current filling level of the relevant leaky bucket then is calculated by incrementing the new filling level by the influx quantity corresponding to the incoming message cell.

When the current filling level calculated in this manner exceeds the maximum filling level of the leaky bucket, i.e., an overload condition, the measure D is set to a specific value, for example, zero, this specific value indicating that the message cell now under consideration is being discarded. When the current filling level calculated in this manner does not cause an overload condition, the current filling level and the current point in time at which the message cell under consideration arrived is transferred into the connection associated memory locations of the evaluation means LBM.

This special leaky bucket procedure assures that every message cell has a time slot calculated with the assistance of the measure D allocated to it, this time slot not falling below a time frame vis-a-vis the message cell belonging to the same connection and most recently destined for forwarding which corresponds to the transmission bit rate to define for the relevant virtual connection. The measure D is supplied to the memory means CBM via an appropriate connection.

When the measure D is set to the specific value, for example, zero, for a message cell under consideration, the message cell is discarded. When a measure D other than the specific value is calculated for a message cell under consideration, then the message cell is provided with a flag based on the measure D, this flag indicating the time slot within which the message cell ought to be forwarded.

In FIG. 2, the memory means CBM is illustrated in greater detail. As illustrated, the memory means CBM comprises a message cell memory CM having a plurality of memory rows zero through NCM-1 that can be randomly accessed. An entire message cell C and a pointer Ptr can be stored in each of these memory rows. Such a pointer Ptr makes it possible to designate another memory row in connection with the message cell memory CM.

A plurality of memory rows can be united or combined to form a read-out list with the assistance of these pointers Ptr. A pointer Ptr that has a defined value, for example, zero, can indicate the end of a read-out list. In the presently preferred embodiment, message cells that ought to be forwarded within the same time slot are combined in the form of a read-out list such that the pointer, which is stored in the same memory row as the message cell, that is to be linked to the read-out list refers to the address of the memory row of the message cell memory CM, in which the message cell is stored, which was linked as the hitherto last message cell to the relevant read-out list.

Furthermore, all memory rows not occupied with memory message cells can be combined with the assistance of pointers that respectively indicate the next non-occupied memory row to form a free list that indicates which memory rows are still available for message cells. Also, two additional pointers FLH and FLT associated with the message cell memory CM can be provided that indicate the head and, respectively, the tail of the free list.

Further, the memory means CBM contains a memory arrangement TA that comprises a plurality of memory locations 0 through NTA-1. These memory locations serve the purpose of accepting respective flags that are capable of addressing corresponding memory rows in the message cell memory CM via an addressing line AL. In the exemplary embodiment, the storing of a message cell in conjunction with a flag that corresponds to a respective time slot is undertaken such that the address of the memory row of the message cell memory CM wherein the associated message cell is stored is stored or deposited in a memory location corresponding to the respective time slot and located in a cyclically selected memory TA.

The memory locations of the memory arrangement TA are cyclically selected in sequence by a real time pointer RTP, whereby the memory arrangement TA can be considered a time axis. The real time pointer RTP is incremented with every message cell cycle that, for example, can be assumed to amount to 2.8 μs. For example, the real time pointer RTP can be provided us a counter driven with a clock signal that is capable of assuming a plurality of statuses corresponding in number to the number of memory locations in the memory arrangement TA, whereby respective statuses are capable of addressing corresponding memory locations.

On the basis of the flag respectively stored in them, the memory locations of the memory arrangement TA selected during a current selection cycle by the real time pointer RTP, and allocated to corresponding time slots, determine those message cells stored in the message cell memory CM that ought to be immediately forwarded.

The administration of flags that refer to message cells intended for immediate forwarding or read-out lists is undertaken with the assistance of a control means OC. The control means OC comprises first-in-first-out (FIFO) memory IW formed by a plurality of memory elements 0 through NIW-1. The addresses of the memory locations of the memory arrangement TA that contain flags of message cells, which ought to be immediately forwarded or read-out lists are respectively written into the memory elements of the FIFO memory IW. Pointers references IWH or, respectively, IWT can be provided for identifying the first or, respectively, the last memory element occupied in the FIFO memory. By means of a read pointer RP, the respective address contained in the first memory element selects a memory location of the memory arrangement TA, whereby the flag contained therein selects the memory row of the message cell memory CM of a message cell now to be forwarded now, the selection being made via the addressing line AL. The read pointer RP designates a memory location of the memory arrangement TA corresponding to a respective time slot until all message cells that ought to be forwarded at this time slot have been forwarded.

It is provided in the exemplary embodiment that the designations of memory locations occupied with memory row addresses in the memory TA whose contents cannot yet be processed in the cyclical selection of a respective memory location due to a still on-going handling of preceding memory locations are stored in a FIFO memory IW whose content is handled with priority in comparison to the content of the memory TA.

The function of a circuit arrangement that operates according to the method of the invention is set forth below and in FIG. 3 with continuing reference to the other figures. FIG. 3 illustrates an example of a chronological presentation of events sequencing during a message cell cycle n in a circuit arrangement operating according to the method of the invention.

In FIG. 3, line RD illustrates that a message cell that was already intended for forwarding during a preceding message cell cycle n-1 is forwarded onto the output line OL during approximately the entire message cell cycle n under consideration. Line WR illustrates that a sequentially transmitted message cell just incoming on the input line IL is written into the memory row of the message cell memory CM which the pointer FLH now indicates. As soon as the header part of the message cell now incoming has arrived with its virtual channel number VCI, the measure D is calculated for this message cell in the evaluation means LBM, as illustrated by line LBM.

At the end of the above-described leaky bucket procedure implemented in the evaluation means LBM, the calculated measure D is forwarded to a procedure LK set forth in greater detail below. As may be seen from line CBM, procedures referenced UL, LK and SEL successively sequence during a message cell cycle.

When a message cell is forwarded during the current message cell cycle, the procedure UL assists in unlinking the associated memory row of the message cell memory CM from the time slot indicating this message cell cycle and in appending this memory row that has become free to the end of the free list, whereby the pointer FLT indicating the end of the free list now references the newly added memory row.

When a message cell is received during the current cell cycle and the evaluation means LBM does not define the arrived message cell as a discard, the measure D supplied by the evaluation means LBM is supplied to the procedure LK. Proceeding from the point in time just established by the real time pointer RTP, a time slot during or at which the associated message cell ought to be forwarded is determined with the assistance of the measure D.

With the assistance of the procedure LK, the memory row of the message cell memory CM, which the pointer FLH designates during the current message cell cycle and into which the message cell that has just arrived is written, is connected to the flag that corresponds to the time slot that was calculated for the present message cell. It is thereby provided that in the exemplary embodiment either (1) that—when it is a matter of the hitherto sole message cell that is to be read out at a defined time slot—a flag that references this memory row of the message cell memory CM is set in the memory location of the memory arrangement TA corresponding to this time slot; or (2) that—when at least one message cell that ought to be read out at the defined time slot is already present—the associated memory row is connected, with the assistance of the pointer, to the read-out list of memory rows that ought to be read out during or at this time slot. In the second case, the respective flag in the memory arrangement addresses the memory row, that was linked as the last to its read-out list. Finally, the pointer FLH designates the memory row of the message cell memory CM into which writing can be undertaken during the next memory cell cycle.

When a message cell is to be forwarded during the following message cell cycle, the address of the memory row of the message cell memory CM from which the associated message cell shall be read is identified with the assistance of the procedure SEL.

It proceeds from the above description of FIG. 3 that the memory row of the memory arrangement CM that can be written during the next message cell cycle or, respectively, the memory row of the message cell memory M that is to be read is already determined during every message cell cycle. It also proceeds from this description that a message cell arriving during the current message cell cycle can already be forwarded during the following message cell cycle, the delay in the forwarding of message cells caused by the application of the method of the invention amounting to the duration of one message cell cycle.

FIG. 4 illustrates an example of what events can sequence in a method of the invention for five successive message cell cycles a) through e) that correspond to the corresponding time slots. It should be noted that only the memory locations 6 through 13 that correspond to the message cell cycles 6 through 13 are illustrated in FIG. 4 for the memory TA. The memory locations of the memory TA are cyclically selected by the real time pointer RTP progressing with every message cell cycle. In accordance therewith, the chronological succession of selections of the memory locations of the memory TA can be considered as a time axis.

As may be seen in message cell cycle a), the message cells 4, 3 and 2 that are combined to form a read-out list should be forwarded during or at time slot 8 in the memory arrangement TA and a message cell referenced 1 is to be forwarded during or at the time slot 9. Respective flags are set to the time slots 8 and 9, these stating that at least one message cell is to be forwarded during or at these time slots. For the purposes of this discussion, it can be assumed that the FIFO memory IW initially is unoccupied.

With reference now to message cell cycle b), the real time pointer RTP has progressed to the time slot 8. It can be assumed that a message cell 6 had been written into a memory row (not shown) of the message cell memory CM at this point in time and that this message cell is to be forwarded during or at time slot 11 and that a flag designating this has been set to time slot 11 with the assistance of the procedure LK. It is found at the current selection of the time slot 8 that a flag is set during this time slot. The numeral 8 for the time slot 8 is written into the memory IW. The read pointer RP that considers the first element in the memory IW organized as a FIFO now designates the time slot 8 and thus indicates that at least one message cell is still to be read out during or at this time slot. In the case under consideration, the message cell 4 is selected with the assistance of the procedure SEL for forwarding during the next-following message cell cycle.

In the message cell cycle c), the real time pointer RTP has progressed to time slot 9. When selecting the memory location corresponding to the time slot 9, it has found that at least one message cell—the message cell 1 in the case under consideration—is to be forwarded, to which end, the numeral 9 designating the time slot 9 is accepted into the memory IW. During time slot 9, the message cell 4 presented during cycle b) is forwarded onto the output line OL, whereby the memory row of the message cell memory CM wherein the message cell 4 was stored is removed from the associated read-out list with the assistance of the procedure UL and this memory row is appended to the end of the free list. Further, the message cell 3 is selected for forwarding during the next time slot with the assistance of the procedure SEL.

During the message cell cycle d), the real time pointer RTP has progressed to time slot 10. No flag is set for the selected time slot 10 and, thus, no entry into the memory IW is to be undertaken. The read pointer RP continues to indicate that at least one message cell intended for forwarding during or at time slot 8 is still present. The message cell 3 selected during the time slot 9 is now forwarded during the time slot 10 and the message cell 2 is selected for forwarding during the message cell cycle following thereupon.

With reference now to the message cell cycle e), the real time pointer RTP has progressed to time slot 11. It is thereby found that a flag in time slot 11 designates at least one message cell—the message cell 6 in the case under consideration—that is to be forwarded and the numeral 11 designating the time slot 11 is thus transferred into the memory IW. The message cell 2 that was selected during the time slot 10 is forwarded onto the output line, whereby the flag in the memory TA referencing this read-out list is erased with the assistance of the procedure UL.

Since all message cells that are to be forwarded at time slot 8 have now been handled, the numeral 8 indicating time slot 8 is removed from the memory IW and the read pointer RP now designates time slot 9. The message cell 1 that the flag in time slot 9 designates is selected with the assistance of the procedure SEL for forwarding during the following message cell cycle.

During the next message cell cycle (not shown), the real time pointer would have progressed to the memory location of the memory TA designated at time slot 12, the numeral 9 referencing the time slot 9 would have been removed from the memory IW and the read pointer RP would indicate time slot 11, as a result whereof the message cell 6 would be selected for forwarding with the assistance of the procedure SEL.

Finally, during message cell cycle with the real time pointer set to time slot 13, the message cell 6 would be forwarded onto the output line OL and the memory IW would be empty. In a following time slot at which a flag indicates at least one message cell to be forwarded, the read pointer RP and the real time pointer RTP would simultaneously designate this time slot.

According to a particular development of the method of the invention, message cells combined to form a read-out list that ought to be forwarded at one and the same time slot are forwarded beginning with the message cell most recently added to the read out list. This measure prioritizes those message cells that, for example, were delayed due to an access conflict and for which short intermediate storage durations were therefore calculated. As a result, message cells of connections are also prioritized that transmit message cells adhering to the message cell sequence corresponding to the declared transmission bit rate and whose message cells thus typically have short intermediate storage durations, whereby they are united relatively late to a respective read-out list. For the same reasons, this procedure also gives priority forwarding to message cells of connections that do not fully exhaust the transmission bit rate declared for them and whose message cells appear in a uniform message cell sequence.

In contrast thereto, message cells of connections that temporarily exceed the transmission bit rate declared for them are allocated by this procedure in relatively timely fashion to a respective time slot to be selected in the distant future, to be read out at this time slot, this being equivalent to all message cells joined later with such a message cell to form a respective read-out list are read out first.

It can be appreciated that suitable dimensioning of a system for the method of the invention assures that the sequence of message cells of respective connections is observed.

Finally, it can also be appreciated that the method of the invention can be advantageously applied in the area of responsibility of a subscriber who would like to transmit message cells the transmission of which is not timecritical and that are output from subscriber stations having a highly fluctuating message cell repetition rate. Such subscribers can thereby utilize the charging advantage of a connection having a transmission bit rate corresponding to the average message cell repetition rate in comparison to a connection having a transmission bit rate corresponding to the maximum message cell repetition rate.

While preferred embodiments have been shown, modifications and changes may become apparent to those skilled in the art which shall fall within the spirit and scope of the invention. It is intended that such modifications and changes be covered by the attached claims.

What is claimed is:

1. In a communications systems in which message cells belonging to a respective one of a plurality of virtual connections are transmitted according to an asynchronous transmission method via a single transmission line, each of said message cells having a constant number of bits, for each said virtual connection an individual bit transmission rate being defined, the bit transmission rate of each virtual connection being monitored and controlled by a method comprising the steps of:

for each arriving message cell, calculating a time slot during which the message cell ought to be forwarded by calculating leaky bucket quantities of a leaky bucket associated with the virtual connection to which the message cell belongs, such calculation comprising the steps of:

retrieving the current level of the leaky bucket for the virtual connection with which the message cell is associated;

calculating a new level of the leaky bucket by reducing the current level by the amount of bits that have flowed out from the virtual connection since the most recent transmission of a message cell, a rate of outflow of the bits being proportional to the bit transmission rate for the virtual connection;

dividing the new level by the outflow rate to produce a measure relating to a delay from the actual point in time prior to the time slot in which the message cell under consideration ought to be forwarded;

obtaining an actual level of the leaky bucket by increasing the new level by an amount corresponding to a bit count of the message cell under consideration;

discarding the message cell under consideration if the actual level exceeds the maximum filling level of the leaky bucket;

otherwise storing the message cell under consideration as well as a flag identifying the time slot associated therewith, and storing the actual level just calculated as a current level for the leaky bucket as well as the point in time of the arrival of the message cell under consideration;

forming a read-out list of all stored message cells which ought to be forwarded during a respective time slot; and forwarding a first message cell in said read-out list in its associated time slot followed by all other message cells in said read-out list in their corresponding time slots thereafter.

2. The method according to claim 1, wherein the time slot in which a respective message cell is to be forwarded is identified with the assistance of a leaky bucket procedure that evaluates the leaky bucket quantities of a virtual connection for every virtual connection.

3. The method according to claim 2, wherein the leaky bucket quantities include the current occupancy, the maximum occupancy, the out-flow rate, the current influx quantity and the point in time of arrival of the preceding message cell belonging to the virtual connection under consideration.

4. The method according to claim 1, wherein the nondiscarded message cells are respectively stored in a memory row of a random access message cell memory.

5. The method according to claim 4, wherein a determination is already made during every time slot regarding the memory row of the message cell memory that can be written in the following time slot and regarding the memory row of the message cell memory that is to be read out.

6. The method of claim 4, wherein message cells that ought to be forwarded in one and the same time slot are united in a secondary read-out list and a respective pointer that identifies a storage location of the message cells is stored in the same memory row as the last message cell to be forwarded.

7. The method according to claim 1, wherein the message cells respectively united to form a read-out list are forwarded beginning with the message cell most recently united to the read-out list.

8. The method according to claim 1, being utilized at subscriber equipment having highly fluctuating message cell sequence for rendering the message cell sequence more uniform.

* * * * *